3,654,084
METHOD OF PRODUCING YEAST

Sergei Vladimirovich Chepigo, Leningradsky prospekt 74, korpus 2a, kv. 9; Solomon Iosifovich Belenky, Nagatinskoe shosse 10, kv. 43; Vsevolod Sergeevich Somov, Nastasiinsky pereulok 4, kv. 8; Vasily Gerasimovich Voronkov, Nagatinskoe shosse 10, kv. 17; Mikhail Alexandrovich Belavsky, Ulitsa Goncharova 13b, kv. 22; Oleg Georgievich Korotaev, Ramenki 3, d. 76, kv. 1; Galina Sergeevna Rodionova, Ulitsa Fomichevoi 2, kv. 32; and Nikolai Spiridonovich Maximenko, Ulitsa Verkhne-Pervomaiskaya 59–35, korpus 2, kv. 81, all of Moscow, U.S.S.R.; Boris Aronovich Glazman, Ulitsa Karla Libknekhta 81, kv. 12, Krasnodar, U.S.S.R.; and Larisa Alexandrovna Belova, Donskaya ulitsa 19/25, korpus A, kv. 49; and Galina Ivanovna Vorobiova, Ulitsa Golyanovo 83, kv. 2, both of Moscow, U.S.S.R.
No Drawing. Filed June 16, 1969, Ser. No. 833,793
Int. Cl. C12c 11/10
U.S. Cl. 195—95        4 Claims

ABSTRACT OF THE DISCLOSURE

Process for producing yeast, predominantly fodder-type yeast, by continuous cultivation of yeast in an aqueous nutrient medium containing plant tissue hydrolyzates or n-paraffins as the source of carbon and aerating the nutrient medium with air to which ozone is added in a concentration of $10^{-6}$ to 1.5 vol. percent.

---

The present invention relates to methods of producing yeast, predominantly fodder type, on aqueous nutrient media containing as the source of carbon, hydrolyzates of plant tissues or hydrocarbons of the n-paraffin series, said media being aerated with atmospheric air.

Methods are known for producing yeast on aqueous nutrient media containing as the source of carbon, hydrolyzates of plant tissues, wherein inhibitors of yeast growth, such as furfural, hydroxymethylfurfural, tannin, physiologically active colloids, etc., have an adverse effect on the processes of yeast respiration and propagation.

This reduces the yeast yield and retards multiplication. In order to increase the yeast yield, nutrient media must be greatly diluted (to about 1% concentration of reducing substances), which results in less efficient ultilization of the manufacturing facilities.

When employing known methods of growing yeast on aqueous nutrient media containing as the source of carbon, hydrocarbons, for instance, n-paraffins, the medium is aerated with air alone, or with air supplemented with oxygen. The above conditions, however, do not ensure sufficient intensity of growth, since hydrocarbons are oxidized with difficulty and utilized by microorganisms at low rates.

It is an object of the present invention to provide a method of growing yeast, predominantly fodder-type yeast, on aqueous nutrient media, said method providing an intensification of the process of growing yeast and higher yeast yield.

The foregoing and other objects have been accomplished by the provision of a method of growing yeast on an aqueous nutrient medium containing as the source of carbon a substance selected from the group of substances consisting of hydrolyzates of plant tissues and hydrocarbons of the n-paraffin series, wherein said aqueous nutrient medium is aerated with air to which ozone is added.

Ozone can be added in a concentration of $10^{-6}$ to 1.5 vol. percent.

Ozone is preferably added to the air used for treating the aqueous nutrient medium when said medium is being prepared.

Ozone can also be added to the air employed for aerating the aqueous nutrient medium in the process of yeast growing.

Besides, ozone can be added to the air used for treating water prior to employing said water in preparing the nutrient medium.

The only carbon source used in preparing the aqueous nutrient medium is a substance selected from the group of substances consisting of hydrolyzates of plant tissues and hydrocarbons of the n-paraffin series.

Hydrocarbons employed comprise the paraffin fraction of petroleum consisting of compounds with 11 to 30 carbon atoms and boiling in the range of 240 to 360° C.

Hydrolyzates of plant tissues employed comprise agricultural wastes, e.g., hydrolyzates of cotton seed hulls, corncobs, etc., wastes of the wood-working industry, and also wood hydrolyzates.

Fermentation is carried out continuously in an aqueous medium having a standard composition of microelements and potassium, magnesium, phosphorus and nitrogen salts.

The pH of the nutrient medium shall be maintained in the range of 3 to 6, preferably in the range of 4 to 5.5. The optimum temperature of the fermentation process is usually in the range of 25 to 40° C.

Ozone is one of the strongest oxidizing agents, and is capable of oxidizing diverse chemical compounds.

When treating hydrolyzates with ozone, the pH of the medium and the temperature and concentration of the ozone-air mixture shall be maintained at levels providing selective oxidation of inhibitors without oxidizing the carbohydrates essential for yeast nutrition.

Thus, treating a hydrolyzate neutralized to pH 4.5–5.5 with an ozone-air mixture having an ozone concentration of $10^{-2}$ vol. percent at a temperaturue of 50–60° C. lower the furfural concentration from 42.9 mg. percent to 22.8 mg. percent. The concentration of hydroxymethylfurfural is reduced accordingly. Physiologically active colloids are coagulated. The carbohydrate concentration remains practically unchanged.

When yeast is grown on nutrient media prepared from oxonized hydrolyzates, the yeast yield increases by 12 to 25%, depending on the composition of the medium.

Treating hydrocarbons of the n-paraffin series with ozone-air mixtures having an ozone concentration of 1.0–1.5 vol. percent at a temperature of about 100° C. causes oxidation of the terminal groups of n-hydrocarbons and the oxidation of cyclic hydrocarbon impurities if said impurities are present. As a result surface-active organic acids are formed which stabilize emulsions of hydrocarbon nutrient media. The multifold increase in the phase interface on which yeast multiply promotes their propagation and increases the yield of biomass.

Ozone treatment of water before use for diluting hydrolyzates and preparing nutrient media from hydrocarbons of the n-paraffin series raises the redox potentials of said water to levels at which extraneous microorganisms and their spores, and also viruses perish completely. Ozonized water is practically sterile.

Moreover, ozonized water used immediately after preparation oxidizes inhibitors of yeast growth occurring in hydrolyzates and increases the stability of the emulsions of hydrocarbon nutrient media.

When growing yeast, the rate of biomass accumulation and product yield depend on the intensity of redox processes. Adding ozone to the air employed for aeration raises the redox potentials of culture media, i.e. aqueous nutrient media with yeast being grown on them, at the phase interface in the bubbles of the dispersed ozone-air mixture. This creates favourable conditions for the selective oxidation of surface-active inhibitors and metabolic products and activates the enzyme system of the yeast.

For example, when ozone-air mixture containing from $1.5 \times 10^{-4}$ vol. percent to $1 \times 10^{-6}$ vol. percent ozone are employed for aerating nutrient media prepared from hydrolyzates containing from 1.5% to 4.0% reducing substances the yield of yeast biomass, under the influence of ozone, is increased 10-30% or more.

When previously known methods of growing yeast are employed for continuous production processes an increase in the number of undesirable contaminant microorganisms above the permissible standard is frequently observed in the medium. To overcome this, the pH of the medium is usually lowered to 4.0-3.5, which has an adverse effect on the yield of biomass and on other engineering and economic indicators.

Making use of the bactericidal properties of ozone ensures the sterility of all materials entering the yeast-cultivating tanks: culture media, water and air. Moreover, when the air used for aeration contains ozone it is possible to adjust the level of the redox potential of the culture medium in such a way as to create favourable conditions for yeast growth while inhibiting the propagation of a large number of undesirable microorganisms.

The bactericidal properties of ozone are employed for controlling the propagation of contaminant microorganisms through sterilization of hydrolyzates, hydrocarbons, water, air and culture mediums with ozone-air mixtures.

Moreover, the addition of ozone to the air employed for treating hydrolyzates of plant tissues enable the effective utilization of hydrolyzates even containing more than 1.5% reducing substances and a considerable amount of inhibitors of yeast growth, such as furfural and hydroxymethylfurfural.

The method of this invention is illustrated in the following examples.

EXAMPLE 1

Strain SD-10 of yeast *Candida tropicalis* was grown by the continuous method for 60 hours in a 1.5 l. fermenter (volume of substrate 1.5 l.) on a hydrolyzate of cottonseed hulls containing 2.5% of reducing substances and considerable amounts of inhibitors at a temperature of $32.°\pm0.5°$ C. and pH 4.2-4.5, with a 12-hour change of culture fluid. The culture fluid was aerated with air containing $1.5 \times 10^{-4}$ vol. percent ozone. Yield of absolutely dry yeast 55.8 wt. percent.

EXAMPLE 2

Strain NP-4 of yeast *Candida guillermondii* was grown by the continuous method for 18 hours in a 1.5 l. fermenter (volume of substrate 0.5 l.) on an aqueous nutrient medium providing a standard content of microelements and salts of K, Mg, P and N, and containing 1 vol. percent of purified paraffins, at a temperature of $32.0\pm0.5°$ C. and a pH of 4.2-4.5, with a 10-hour change of culture fluid. The culture fluid was aerated with air containing $10^{-4}$ vol. percent of ozone. Yield of absolutely dry yeast 130 wt. percent on basis of paraffins consumed.

We claim:

1. A method of producing yeast, which comprises continuous cultivation of yeast in an aqueous nutrient medium containing as the source of carbon, a substance from the class of substances consisting of hydrolyzates of plant tissues and paraffins of the n-paraffin series, said nutrient medium being aerated with air to which ozone is added in a concentration of $10^{-6}$ to 1.5 vol. percent.

2. A method as claimed in claim 1, wherein ozone is added to the air employed for aeration of the aqueous nutrient medium during cultivation of the yeast.

3. A method as claimed in claim 1, wherein ozone is added to the air employed for treating the aqueous nutrient medium during preparation of said medium.

4. A method as claimed in claim 1, wherein ozone is added to the air employed for treating water prior to its use for preparing said aqueous nutrient medium.

References Cited

UNITED STATES PATENTS 3,257,289   6/1966   Champagnat et al. -- 195—82 X

A. LOUIS MONACELL, Primary Examiner

S. RAND, Assistant Examiner

U.S. Cl. X.R.

195—82, 109; 99—9